United States Patent
Delaney et al.

(10) Patent No.: US 11,803,926 B2
(45) Date of Patent: Oct. 31, 2023

(54) WORKLOAD DISTRIBUTION OPTIMIZER

(71) Applicant: KYNDRYL, INC., New York, NY (US)

(72) Inventors: John V. Delaney, Kildalkey (IE); Alan P. Murphy, Dublin (IE); Claus Schroeder-Hansen, Kbh Oe (DK); Clea A. Zolotow, Key West, FL (US)

(73) Assignee: KYNDRYL, INC., New York, NY (US)

( * ) Notice: Subject to any disclaimer, the term of this patent is extended or adjusted under 35 U.S.C. 154(b) by 1762 days.

(21) Appl. No.: 14/964,664

(22) Filed: Dec. 10, 2015

(65) Prior Publication Data

US 2017/0169529 A1 Jun. 15, 2017

(51) Int. Cl.
G06Q 50/18 (2012.01)
G06Q 10/0633 (2023.01)
H04L 41/50 (2022.01)
H04L 41/0826 (2022.01)

(52) U.S. Cl.
CPC ....... *G06Q 50/184* (2013.01); *G06Q 10/0633* (2013.01); *H04L 41/0826* (2013.01); *H04L 41/5029* (2013.01); *H04L 41/5096* (2013.01)

(58) Field of Classification Search
CPC .................................................. G06Q 50/184
See application file for complete search history.

(56) References Cited

U.S. PATENT DOCUMENTS 7,756,737 B2 7/2010 Hazzard et al.
8,448,127 B2 5/2013 Lindley et al.
8,631,105 B2 1/2014 Aschoff et al.
(Continued)

FOREIGN PATENT DOCUMENTS

EP 2657842 A1 10/2013
EP 2689366 A1 1/2014
WO WO2014016092 A2 1/2014

OTHER PUBLICATIONS

Peter Mell et al, The NIST Definition of Cloud Computing, National Institute of Standards and Technology, Special Publication 800-145, 2011.
(Continued)

*Primary Examiner* — John W Hayes
*Assistant Examiner* — Zehra Raza
(74) *Attorney, Agent, or Firm* — Dan Housley; Andrew M. Calderon; Calderon Safran & Cole, P.C (57) ABSTRACT

Workload distribution is automatically optimized. Cost penalty amounts imposed on executing a database operation transaction by current and alternative processing pathway options are determined as a function of execution response times that exceed a service level agreement time limit. Respective computer processing hardware costs are determined for executing the database operation transaction via each of the current and alternative processing pathway options. Respective licensing costs are determined for migrating execution of the database operation transaction to each of the alternative processing pathway options. Accordingly, the current or alternative middleware option that has a lowest total combined cost of licensing costs, computer processing hardware costs and service level agreement penalty costs is chosen as the path for execution of the database operation transaction.

19 Claims, 6 Drawing Sheets

(56) References Cited

U.S. PATENT DOCUMENTS

| | | | |
|---|---|---|---|
| 8,655,702 B2 | 2/2014 | Ranjekar | |
| 8,700,752 B2 | 4/2014 | Bouillet et al. | |
| 8,789,050 B2 | 7/2014 | Hoffman et al. | |
| 8,904,204 B2 | 12/2014 | Fletcher et al. | |
| 8,909,785 B2 | 12/2014 | France et al. | |
| 2004/0083188 A1 | 4/2004 | Lee et al. | |
| 2004/0221038 A1* | 11/2004 | Clarke, Jr. | G06F 9/5072 709/226 |
| 2005/0240935 A1 | 10/2005 | Ramanathan | |
| 2007/0271570 A1* | 11/2007 | Brown | G06F 9/5033 718/105 |
| 2011/0022870 A1 | 1/2011 | McGrane et al. | |
| 2011/0258634 A1 | 10/2011 | Bonilla et al. | |
| 2012/0173708 A1 | 7/2012 | Bartfal-Walcott et al. | |
| 2013/0042003 A1* | 2/2013 | Franco | H04L 67/1097 709/226 |
| 2013/0261826 A1 | 10/2013 | Mandagere et al. | |
| 2013/0275382 A1 | 10/2013 | Chi et al. | |
| 2013/0346360 A1* | 12/2013 | Liu | G06F 16/21 707/609 |
| 2014/0297611 A1 | 10/2014 | Abbour et al. | |
| 2014/0376716 A1 | 12/2014 | Petrovykh | |
| 2015/0095089 A1 | 4/2015 | Ginis et al. | |

OTHER PUBLICATIONS

Bossche et al, Cost-Optimal Scheduling in HYbrid IaaS Clouds for Deadline Constrained Workloads, 2010 IEEE 3rd International Conference on Cloud Computing, htts://www.google.co.uk, 2010.

CA Technologies, Optimize Performance and Reduce the Cost of Managing SAP Workloads with CA Workload Automation, http://www.ca.com/ru/collateral/recorded-webcasts/na/optimize-performance-and-reduce-the-cost-of-managing-sap-workloads-with-ca-workload-auomation.aspx, 2014.

BMC Software, Inc., Mainframe Cost Optimization, Cut mainframe costs and boost performance, http://www.bmc.com/it-solutions/mainframe-cost-optimization.html, 2005-2015.

BMC Software, Inc., Five Levers to Lower Mainframe MLC Costs While Mitigating Risk, http://www.bmc.com/forms/MCO-R4-LowerMFMLCCostswhileMitigatingRisk-WP_V2.html?cid=social?zst, 2014.

De Gilio et al, HiperSockets in the Round a z/OS/ z/VM, zLinux Perspective, SHARE Technology . Connections . Results, IBM Design Centers, degilio@us.ibm.com, 2010.

* cited by examiner

WORKLOAD DISTRIBUTION OPTIMIZER

BACKGROUND

Computing workloads for processing database items and other forms of data may be distributed among different middleware operating systems and components, as well as between different hardware options and types. Implementations may be described as three-tier systems that include an application layer (for example, a hypertext transfer protocol ("http") server), middleware and a database.

Middleware often sits between an operating system and applications on different servers and simplifies the development of applications that leverage services from other applications, enabling programmers to create business applications without having to custom craft integrations for each new application. Typically, middleware programs provide messaging services so that different applications can communicate using messaging frameworks like Extensible Markup Language (XML), Simple Object Access Protocol (SOAP), web services, service oriented architecture (SOA), Web 2.0 infrastructure, Lightweight Directory Access Protocol (LDAP), Representational State Transfer (REST) and JavaScript Object Notation (JSON). The systematic tying together of disparate applications, often through the use of middleware is also known as enterprise application integration (EAI).

At a basic level, middleware provides services required to connect applications together such as concurrency, transaction management, threading and messaging. More sophisticated implementations of middleware principles are baked into modern integration infrastructure such as enterprise service bus (ESB) and API management software to provide greater governance, risk management and accountability.

BRIEF SUMMARY

In one aspect of the present invention, a method for automatically optimizing workload distribution by selecting a lowest cost processing pathway includes determining a cost penalty amount imposed on executing a database operation transaction by a current processing pathway option by a service level agreement as a function of an execution response time that exceeds a time limit of the service level agreement. One or more alternative processing pathway options are identified as available for executing the database operation transaction, and respective response times are estimated for executing the database operation transaction via each of the alternative processing pathway options. Respective cost penalty amounts are determined for each of the alternative processing pathway options as imposed by the service level agreement as a function of their respective estimated execution response times exceeding a time limit of the service level agreement. Respective computer processing hardware costs are determined for executing the database operation transaction via each of the current and alternative processing pathway options. Respective licensing costs are determined for migrating execution of the database operation transaction to each of the alternative processing pathway options from the current processing pathway option. Accordingly, the current or alternative middleware option that has a lowest total combined cost of licensing costs, computer processing hardware costs and service level agreement penalty costs is chosen as the path for execution of the database operation transaction.

In another aspect, a system has a hardware processor in circuit communication with a computer readable memory and a computer-readable storage medium having program instructions stored thereon. The processor executes the program instructions stored on the computer-readable storage medium via the computer readable memory and thereby determines a cost penalty amount imposed on executing a database operation transaction by a current processing pathway option by a service level agreement as a function of an execution response time that exceeds a time limit of the service level agreement. One or more alternative processing pathway options are identified as available for executing the database operation transaction, and respective response times are estimated for executing the database operation transaction via each of the alternative processing pathway options. Respective cost penalty amounts are determined for each of the alternative processing pathway options as imposed by the service level agreement as a function of their respective estimated execution response times exceeding a time limit of the service level agreement. Respective computer processing hardware costs are determined for executing the database operation transaction via each of the current and alternative processing pathway options. Respective licensing costs are determined for migrating execution of the database operation transaction to each of the alternative processing pathway options from the current processing pathway option. Accordingly, the current or alternative middleware option that has a lowest total combined cost of licensing costs, computer processing hardware costs and service level agreement penalty costs is chosen as the path for execution of the database operation transaction.

In another aspect, a computer program product for automatically optimizing workload distribution by selecting a lowest cost processing pathway has a computer-readable storage medium with computer readable program code embodied therewith. The computer readable hardware medium is not a transitory signal per se. The computer readable program code includes instructions for execution which cause the processor to determine a cost penalty amount imposed on executing a database operation transaction by a current processing pathway option by a service level agreement as a function of an execution response time that exceeds a time limit of the service level agreement. One or more alternative processing pathway options are identified as available for executing the database operation transaction, and respective response times are estimated for executing the database operation transaction via each of the alternative processing pathway options. Respective cost penalty amounts are determined for each of the alternative processing pathway options as imposed by the service level agreement as a function of their respective estimated execution response times exceeding a time limit of the service level agreement. Respective computer processing hardware costs are determined for executing the database operation transaction via each of the current and alternative processing pathway options. Respective licensing costs are determined for migrating execution of the database operation transaction to each of the alternative processing pathway options from the current processing pathway option. Accordingly, the current or alternative middleware option that has a lowest total combined cost of licensing costs, computer processing hardware costs and service level agreement penalty costs is chosen as the path for execution of the database operation transaction.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
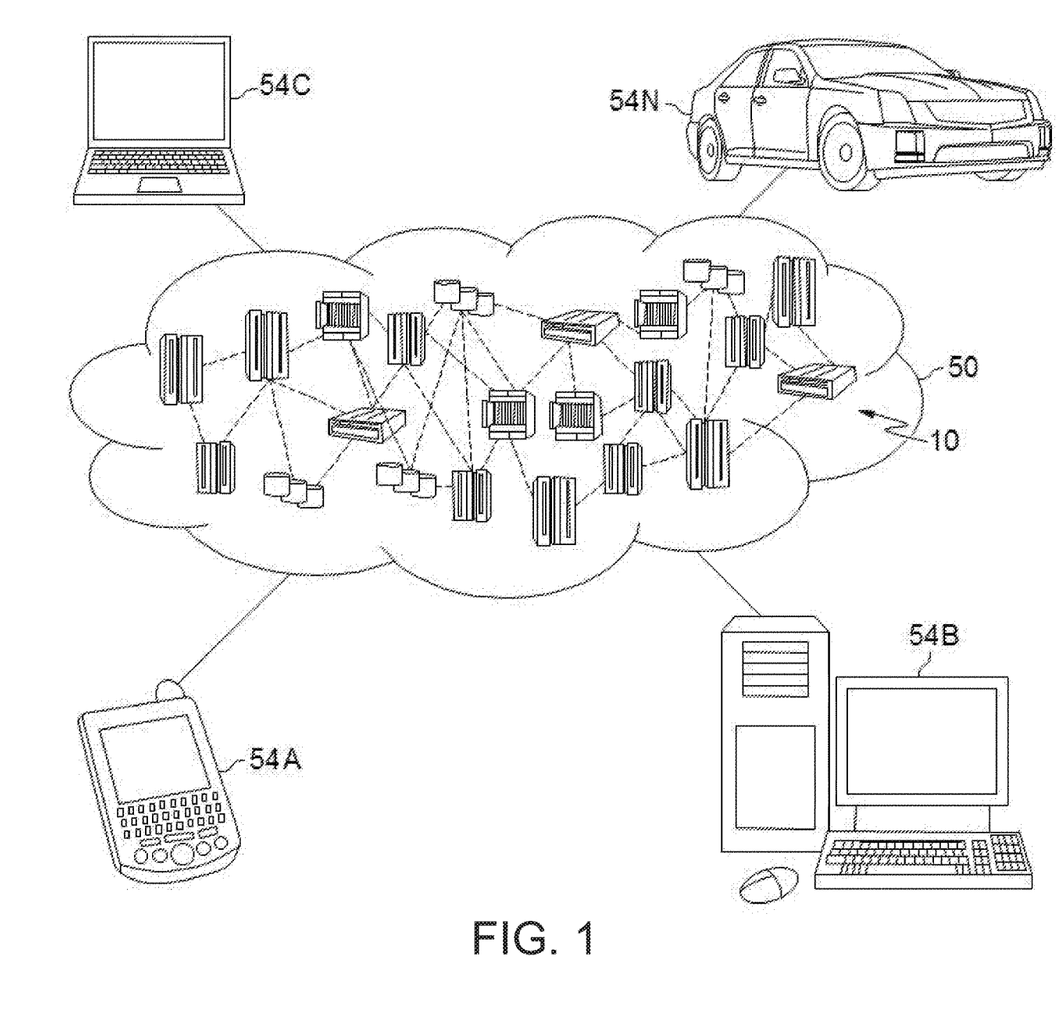
FIG. 1 depicts a cloud computing node according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
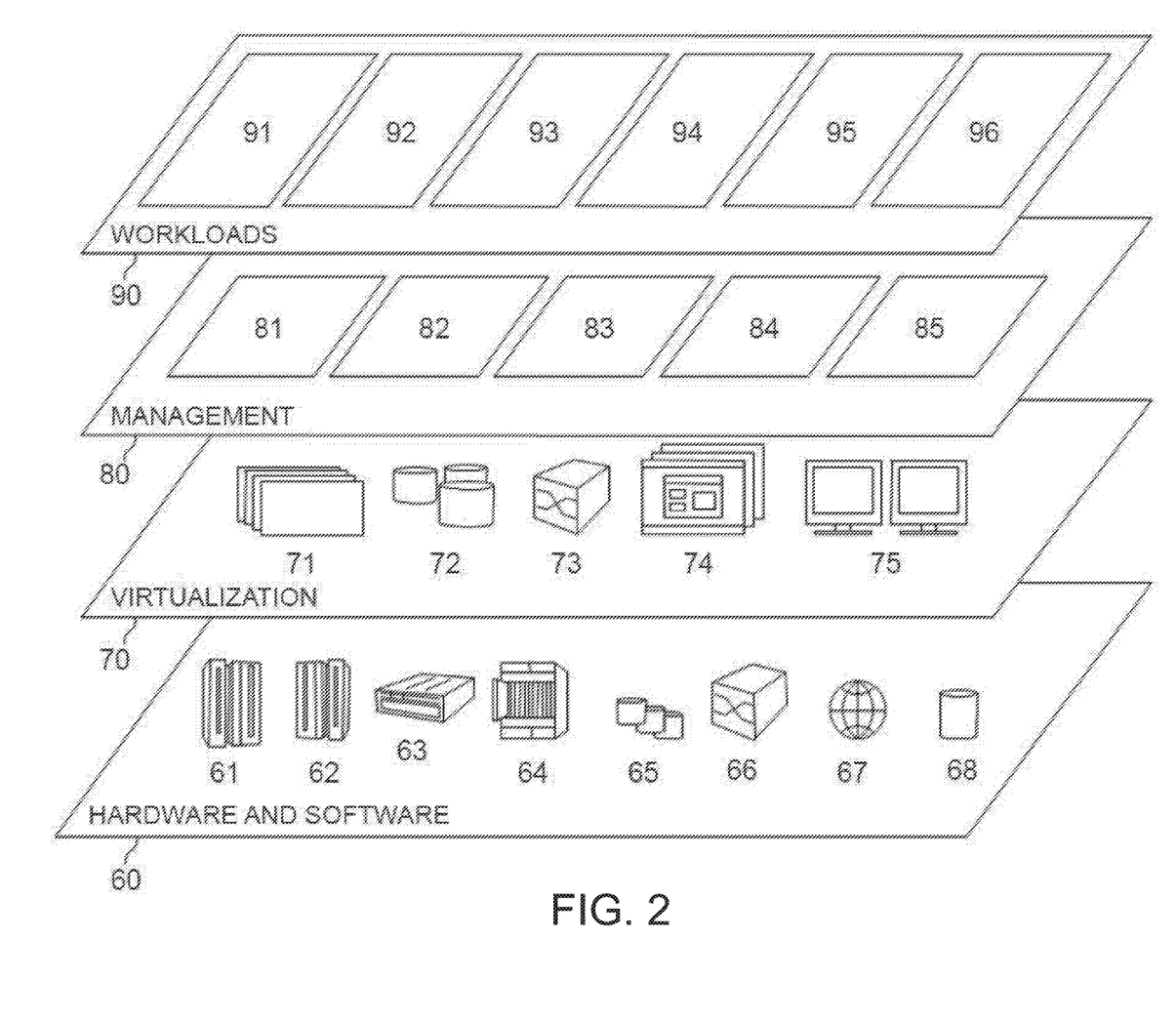
FIG. 2 depicts a cloud computing environment according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 optimizing workload distribution by selecting a lowest cost pathway option path as described below.

Figure 3:
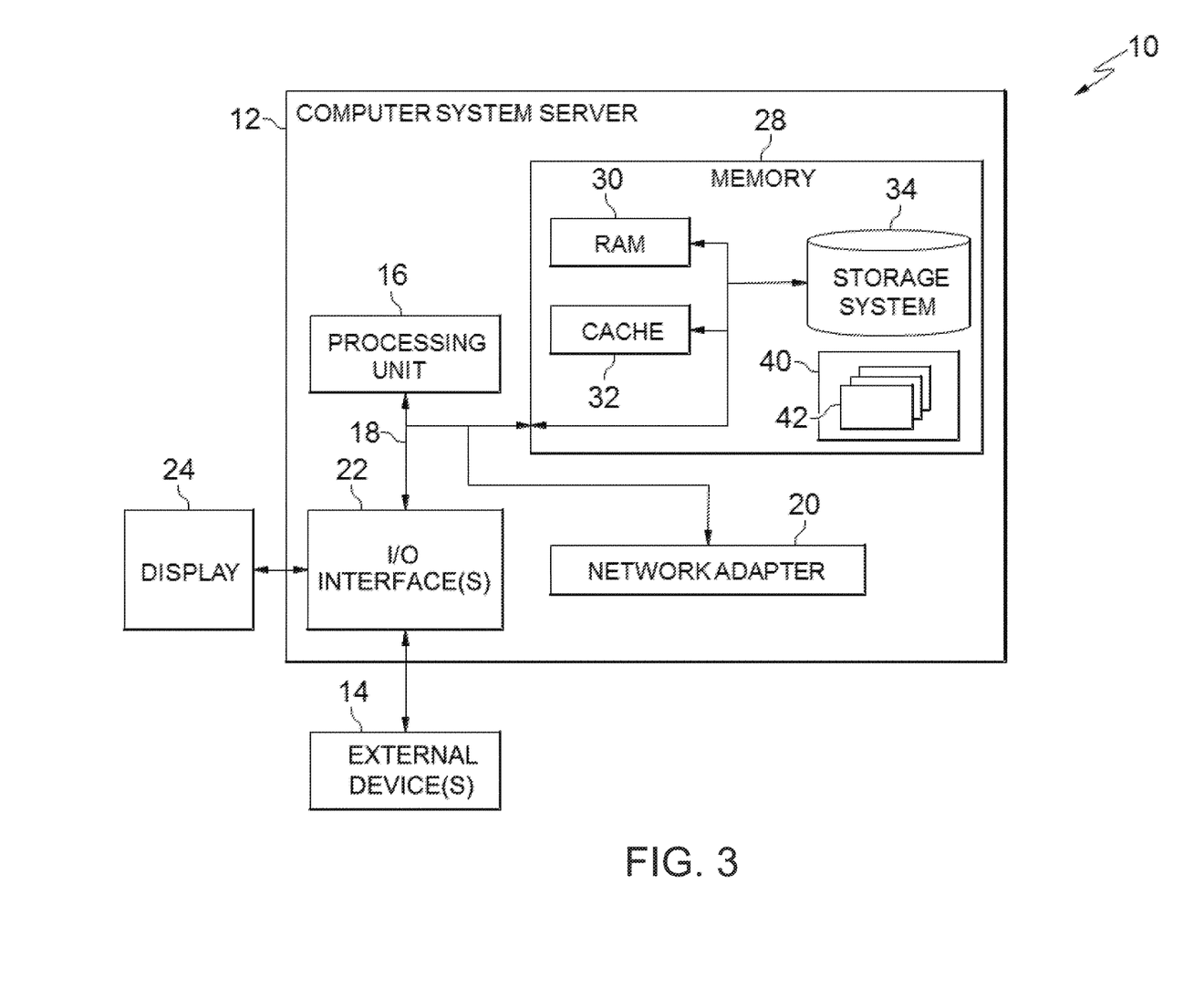
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
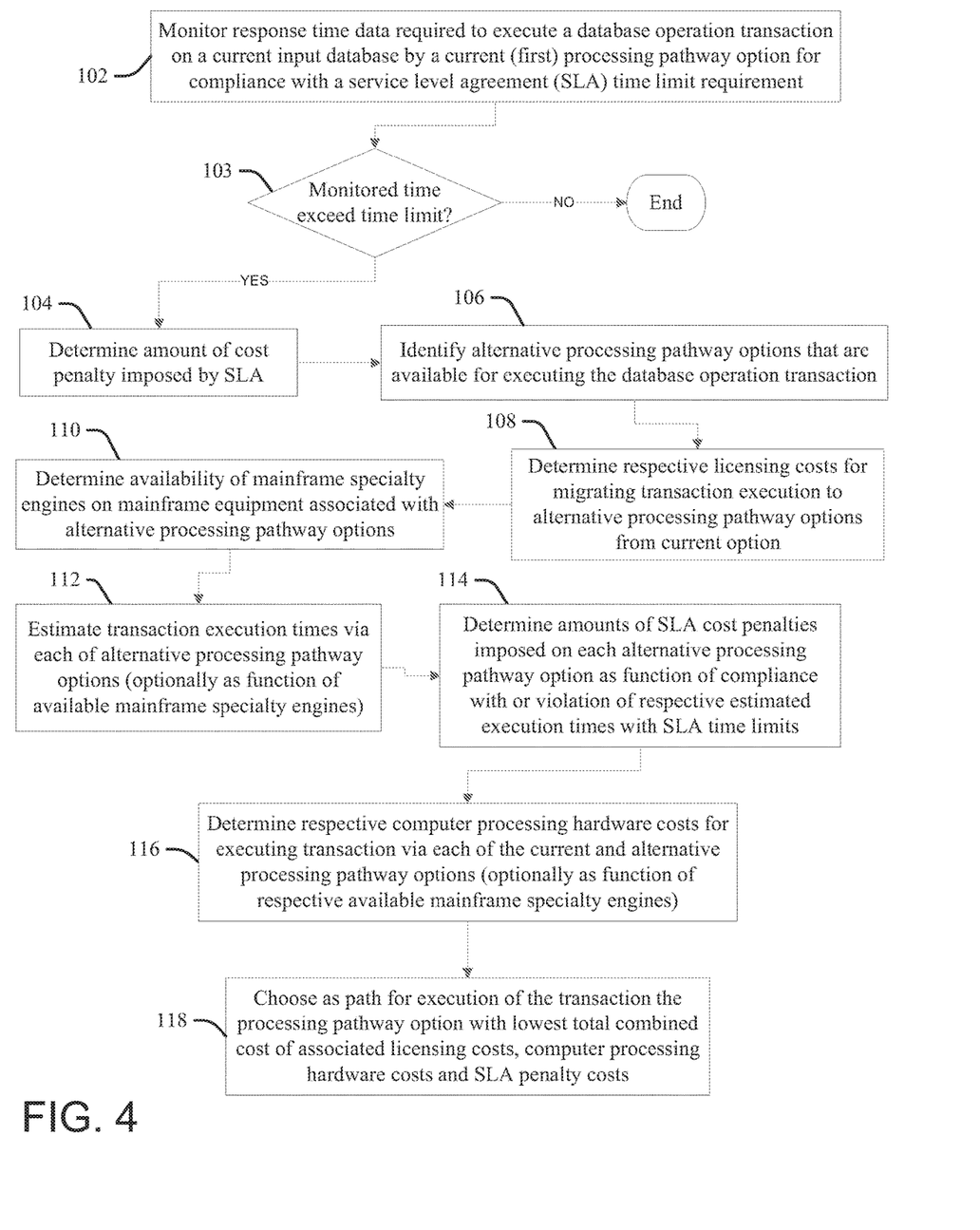
FIG. 4 is a flow chart illustration of a method or process according to an aspect of the present invention optimizing workload distribution by selecting a lowest cost middleware path.

FIG. 4 (or "FIG. 4") illustrates a computer implemented (method or process) of an aspect of the present invention that automatically optimizes workload distribution by selecting between different pathway options to find a lowest cost path as a function of differences in licensing, hardware cost attributes, availability of mainframe specialty engines and service level agreement (SLA) penalty costs. A processor (for example, a central processing unit (CPU)) executes code, such as code installed on a storage device in communication with the processor, and thereby functions as an optimized workload distributor appliance and performs the process step elements illustrated in FIG. 4.

At 102 response time data required to execute a database operation transaction on a current input database by a current (or "first") processing pathway option is monitored for compliance with an SLA time limit requirement, namely that it does not require a time in excess of a limit defined by the SLA (hereinafter sometimes "an excessive time") and thereby trigger impositions of financial penalties for failing to comply with terms of the SLA. SLA objectives are defined as a function of response time, generally in milliseconds. Response time feeds are taken in on a real time basis and analyzed against SLA data to ensure that response time objectives are being met. In some aspects historical data is collected for workloads executing on other similar processing pathway software, hardware and operating systems and used to determine a generalized response time history.

In response to determining at 103 that the monitored response time for executing the database operation transaction is an excessive time and is thereby not compliant with the SLA time requirement, at 104 an amount of an SLA cost penalty imposed by the SLA is determined. The amounts may vary as a function of an amount or frequency of a value that exceeds a specified limit, in some aspects as considered in the context of a specific time period that spans the time of execution, as discussed in more detail below.

At 106 one or more (second, etc.) alternative processing pathway option is identified that is available for executing the database operation transaction.

At 108 respective licensing costs are identified (determined) that are incurred by migrating execution of the database operation transaction to each of the alternative processing pathway options from the current processing pathway option.

In an optional step, alternative embodiments according to the present invention determine at 110 the availability of mainframe specialty engines on mainframe equipment associated with the alternative processing pathway options.

At 112 the process estimates a response time for executing the database operation transaction via the alternative processing pathway options (including as a function of any mainframe specialty engines that are determined in the optional step at 110 to be available on mainframe equipment associated with the alternative processing pathway options).

At 114 the process determines amounts of any SLA cost penalties imposed on executing the database operation transaction via the alternative processing pathway options as a function of compliance or violation of the time limits specified by the SLA.

At 116 the process determines respective computer processing hardware costs for executing of the database operation transaction via each of the current and the alternative processing pathway options (including as a function of any available mainframe specialty engines identified at 112).

At 118 chooses as a path for execution of the database operation transaction as the one of the current and the alternative processing pathway options that has the lowest respective total combined cost of associated licensing costs, computer processing hardware costs and SLA penalty costs.

Figure 5:
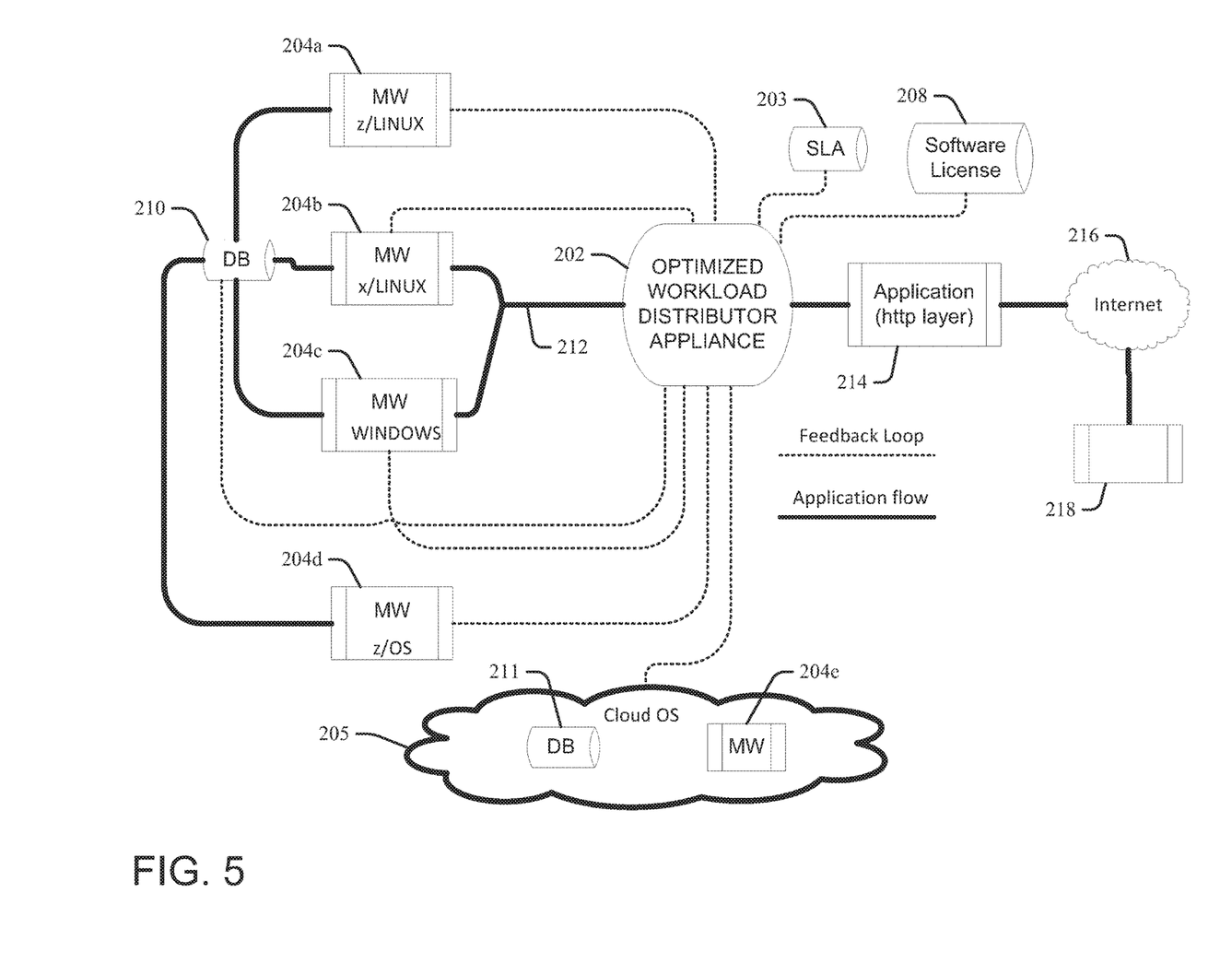
FIG. 5 is a graphic illustration of an embodiment of the present invention for a three-tier computer system.

FIG. 5 is graphic illustration of an embodiment according to the present invention for a three-tier computer system wherein the processing pathway options are middleware options. An Optimized Distributor Workload Appliance (hereinafter sometimes the "optimizer") 202 according to the present invention is in a feedback circuit communication (denoted by the dotted-line connections in FIG. 5) with and thereby takes in response time feeds from each of available and selectable middleware (or "midrange") operating systems 204a, 204b, 204c, 204d and 204e which include the current and one or more alternative middleware options discussed in FIG. 4. It will be understood that other examples may have more or less than the five middleware operating systems 204a, 204b, 204c, 204d and 204e discussed in the present example. Generally, information is updated in a Common Data Model (CMDB) that includes the software licensing types and amounts of each workload that will be potentially migrated. The optimizer 202 is enabled to act like a load balancer, distributing an http workload from an application layer to one or more of the appropriate middleware options as a function of a lowest cost determination (at 118, FIG. 4), which may also include migration of query operations from one to another, lower-cost option of different database options 210 and 211.

The optimizer 202 monitors (at 102, FIG. 4) response time feeds from the middleware operating systems 204a, 204b, 204c, 204d and 204e for compliance with applicable service level agreement (SLA) time requirements that are obtained from an SLA database 203 which contains response time information that defines response time objectives that must be met by the middleware operating systems 204a, 204b, 204c, 204d and 204e.

In some examples, the SLA response time information standards are percentile indices, wherein monitored response times may include a plurality of response times that each exceed a specified limit, and wherein the a determination that the monitored times are not compliant with the SLA requirement (at 103 FIG. 4) is not triggered until a total percentage of the non-compliant response times meet a threshold limit. For example, for a 90th percentile SLA requirement that the response times do not exceed three seconds, 10 transactions out of 100 may exceed the SLA requirement before a non-compliance determination is made (at 103, FIG. 4).

A license database 208 contains the types of software licenses applicable across the various middleware environments. The middleware software licenses may be based on (or associated with) a number of processors accessible to a server where the software is installed; a number of cores available to a hypervisor or virtual machine monitor (VMM, a piece of computer software, firmware or hardware that creates and runs virtual machines), which typically excludes counting a number of instances/installations of the software; or a combination of a number of installations and a number of cores available to the software in each installation. For example, for the z/Linux® middleware operating system 204a under z/VM, an example midrange license is associated with a number of IFLs available to z/VM either as dedicated IFLs, or the size of a pool of IFLs that can be shared across all logical partitions (LPARs) in the CPC. (LINUX is a registered trademark of Linus Torvalds in the United States, other countries, or both) Other midrange license cost structure examples for alternative software that are not processor-intensive may be based on a number of licensed instances, unrelated to how the instances are hosted.

In the present example, the z/LINUX middleware operating systems 204a is licensed under z/VM, feedback to the optimizer 202 is provided by middleware (for example, Websphere®, though other appropriate middleware software will be apparent to one skilled in the art), existing Tivoli® response time records, or MON CAT data. (TIVOLI and WEBSHERE are registered trademarks of IBM in the United States or other countries.)

The x/LINUX (or AIX®) middleware operating system 204b provides feedback from middleware (WEBSHERE, etc.), existing TIVOLI response time records, storage resource management (SRM) or other performance data. (AIX is a registered trademark of IBM in the United States or other countries.)

The Windows® middleware operating system 204c provides feedback from the middleware (WEBSHERE, etc.), the existing TIVOLI response time records, "PerfMon" and other performance data. (WINDOWS is a registered trademark of the Microsoft Corporation in the United States or other countries.)

The z/OS® middleware operating system 204d provides feedback from System Management Facility (SMF) records from a Customer Information Control System (CICS) transaction server run on the Z/OS mainframe system, including data for response time features for the middleware. (Z/OS is a registered trademark of IBM in the United States or other countries.)

The Cloud middleware Operating Systems (OS) 204e is run on a public or private cloud 205, and provides feedback as discussed with the options 204a, 204b, 204c and 204d. It will be understood that any of the other middleware options 204a, 204b, 204c and 204d may also be run within the cloud 205, however additional network time may have to be added to their respective transaction response times.

A database back end 210 generally includes a standard Z/OS Virtual storage access method (VSAM) file, wherein feedback to the optimizer 202 may be acquired from either the middleware (WEBSHERE, etc.), existing TIVOLI response time records, SMF or Resource Management Facility (RMF) records, though other examples of the database 210 may include any query-able database, for example an Oracle® Database, etc. (ORACLE is a registered trademark of Oracle and/or its affiliates in the United States or other countries.) A cloud database 211 option may be on any operating system supported by the cloud 205, and is generally used as a read-only database. This avoids the need to synchronize writes across two disparate databases, which may be problematic due to limitations on using data-sharing (as a secondary database may not be on Z/OS).

Efficiently distributing computing workloads for processing database items among different middleware and hardware resource options is difficult in the prior art. Mainframe platforms typically have a complex software pricing scheme, commonly based on the lowest of logical partition (LPAR) defined capacity, or on usage as tracked in a four-hour rolling average, wherein charges are based on a highest four-hour average. Managing mainframe technology is also made more complex by the presence of specialty engines that do not count against MSU cost charges wherein the MSU signifies a measurement of the amount of processing work a computer can perform in one hour. Different hardware equipment may also have different acquisition, power and maintenance and associated labor costs (for example, some geographic areas will have higher costs for machine acquisition or operation labor for the same equipment relative to other areas).

In contrast, the optimizer 202 of FIG. 5 uses feedback loop communications to select a most-optimal one of the middleware options 204a, 204b, 204c, 204d and 204e for a next set of transactions, based on optimized end-to-end response times and computational and monetary costs that determined via predictive elements and processes. Aspects determine which optimal path will create response time benefits while not incurring excessive total costs that comprehend any prevent service-level agreement (SLA) penalties.

Different implementations of the same middleware software costs may also have different licensing costs. For example, a site license may cover multiple, repeating licenses across the same physical site, while instance licenses create an additional charge for each license created, and host licenses will not incur additional expenses for additional license creations as long as certain conditions are met (for example, that all the licenses stay on a same physical host and do not travel to a different machine). Mainframe software licensing information and rates within the license database 208 may be typically associated with (based on) a peak rolling 4 hour average (R4H), where the system monitors the current R4H average and a user or service provider may define a performance cap based on a set value, and may constrain the use of specialty CPUs that can be used for certain, specified workloads, wherein any work run on these specialty CPUs are not recorded under the R4H average.

Whether work is eligible to be run on specialty CPUs is dictated by the application type (Java™ for example is eligible) and also on where the transaction originated (for example, a DB2 query originating on distributed platforms may be eligible). (JAVA all Java-based trademarks and logos are trademarks or registered trademarks of Oracle and/or its affiliates.) License types considered for cost generation include LPAR, box, site, "million service units" ("MSU"), 4-hour, and costs associated per license and per MSU. Accordingly, aspects consider as inputs platform-based software pricing determined from the license database 208, for example based on a peak rolling 4 hour average for a current or first platform (such as for IBM z System™ usage), or based on peak load usage for a different, alternative or second platform. (Z SYSTEM is a trademark of the International Business Machines Corporation ("IBM") in the United States or other countries.) Thus, optimal path determinations may be responsive to different costs that accrue for similar amounts of usage of the same middleware software item, based on differences in the type of license that applies to the usage, hardware and location costs, the criteria used to calculate rates applicable to mainframe equipment usage, the presence or use of specialty engines within the mainframe equipment, etc.

Prior art methods and system fail to efficiently predict or estimate actual software costs in view of the complexities noted above. Price estimates determined and optimized at the time of installation of the machine and the application may be unnecessarily high, due to failures to optimize path as a function of underlying transaction costs. For example, under the prior art information technology (IT) architects typically look at a current install base for mainframe databases, middleware placement, and server hypertext transfer protocol (http) farms and try to optimize a single path for expenses. This type of architecture does not take into account that many applications and middleware can run on many different types of operating systems and hardware, that they may be re-optimized "in-flight" to take advantage of cost optimization on a transaction by transaction basis.

For example, ad-hoc user-written jobs are very common for analytics and are used extensively in retail, insurance and banking. These huge Structured Query Language (SQL) queries run against mainframe databases. As they start running externally from a mainframe, a significant percentage (for example, 60% of the workload) could run on a specialty engine, leaving only 40% of the utilization as chargeable to the MSUs. However, when the MSUs realize a defined four-hour rolling average or a defined MSU limit, this results in a throttling of the workload under the prior art.

In contrast, aspects of the present invention are responsive to determinations that a read-only workload may experience a higher transaction time in milliseconds (ms), but a cheaper cost if run to a copy of the database located in a cloud. While such an approach would elongate the workload significantly, relative to an overall, long time-frame operating context that indicates that the task may run for six to ten hours already, another three hours of added time may not negatively impact efficiencies and requirements for performing the task, and thus such a selection may define an optimal path over other middleware options, in view of the lower hardware costs accruing to the for cloud based services of the cloud option.

As illustrated in FIG. 5, in one example for a three-tier application the optimizer 202 determines that an optimized (lowest total cost) path 212 for executing a response to an application layer http server 214 database query that is received from a smartphone or other programmable device 218 (that is in communication with the application layer 214 via the internet or other network communication option 216) is satisfied by using the x/LINUX middleware operating system 204b and the WINDOWS middleware operating system 204c to engage the database 210.

In another example of optimization according to the present invention, an http server 214 utilizes the WINDOWS 204c and Z/OS 204d middleware options (for WEBSHERE) going to a Z/OS DB2® database 210. (DB2 is a registered trademark of IBM in the United States or other countries.) If the middleware is on a mainframe the utilization of a specialty engine (for example, a "System z Integrated Information Processor (zIIP)") may not be invoked. Thus, when a four-hour rolling average cap is reached, the optimizer 202 uses a Z/LINUX middleware instance 204a that is not on the mainframe, utilizing Z/LINUX under Z/VM. The Z/OS side 204d recognizes that a middleware workload is coming in and starts using a specialty engine, thus reducing the number of MSUs.

Prior art methods and system also fail to efficiently minimize software pricing and licensing costs and other monetary costs accruing from transactional loading of computer systems. The costs accrued from the use of any given pathway option may be unnecessarily high if transactions are not optimized for the Total Cost of Ownership (TCO) that comprehends software costs (MSU, four-hour rolling averages), license costs (site licenses, host licenses, and instance licenses), hardware equipment (acquisition, power and maintenance) and differential labor costs (for example, some geographic areas have higher costs for machine acquisition or operation labor relative to other areas). Under the prior art TCO is optimized at the time of installation of the machine and the application. Information Technology (IT) architects typically look at a current install base for mainframe databases, middleware placement, and server hypertext transfer protocol (http) farms and try to optimize a single path for expenses. This type of architecture does not take into account that many applications and middleware can run on many different types of operating systems and hardware, that they may be re-optimized "in-flight" to take advantage of cost optimization on a transaction by transaction basis.

In one example, the optimizer 202 looks at the percentile transaction times for a given period (for example, month, day, quarter, etc.) for a one of the middleware options 204b, 204c, 204d and 204e that is currently handling a workload and determines that some transactions are tracking to 3.3 seconds. The optimizer 202 determines that these response times are out of compliance with an applicable SLA, wherein a monthly US$10,000 penalty is triggered for exceeding a 3.0 seconds threshold. Historic data input to the optimizer 202 indicates that similar transactions when handled by the alternative Z/LINUX middleware option 204a use an internal queued direct I/O that consistently outperforms a single gigabit Ethernet used by the current middleware option 204b, 204c, 204d and 204e and provides reduced response times, wherein transaction response times may be cut in half, which brings the timing in compliance with the SLA and drops the SLA penalty cost to zero. Though the migration costs US$500 for an additional monthly Z/LINUX option 204a license cost, total cost of the migration option is much less than the total costs of the current option, due to avoiding the SLA penalty. Accordingly, the optimizer 202 automatically and autonomously migrates the workload to the lowest cost path Z/LINUX middleware option 204a.

In another example, the optimizer 202 migrates a workload from a current x/WINDOWS middleware option 204c to an alternative Z/OS middleware option 204d as the most-likely lowest cost path.

In another example, the optimizer 202 determines that a current x/WINDOWS middleware 204c option is out of compliance with an SLA response time for a current transaction, which will result in imposition of a $10,000 SLA penalty for not reducing the response time. The optimizer 202 determines that the Z/OS middleware option 204d will cut the response time by ⅔ (for example, as it sits right next to the database 210), but also that the LPAR is capped at 100 MSUs and is currently running 3 hours and 59 minutes at that MSU rate. This indicates that the current transaction is likely to go into latent demand, which will not avoid the US$10,000 penalty, and thus this penalty is still considered within the total overall cost of the alternative Z/OS middleware option 204d. However, the licensing costs are lower for the alternative Z/OS middleware option (for example, by $500 USD), which accordingly results in selection of the alternative Z/OS middleware option 204d as a lowest cost path option (at 118 of FIG. 4).

In another example, licenses potentially applicable to migrating a middleware workload from a current x/WINDOWS option 204c to an alternative Z/LINUX middleware option 204a include a site license that covers an installation of each (and thereby obviates additional licenses fees); an additional machine license that imposes $500 USD in license cost if the alternative Z/LINUX middleware option 204a must be run on an additional machine, but no (zero) cost if it can run on the same machine as the current x/WINDOWS option 204c; and a per instance license that imposes $500 USD for an additional instance of the alternative z/LINUX middleware option 204a, whether it runs on the same machine or not. The optimizer 202 determines that a current hardware environment requires that the current x/WINDOWS 204c and the alternative z/LINUX middleware options must run on different computer systems or "boxes" (for example, in response identifying the differences in the "x" and "Z" system identifiers), and that a site license does not apply to a current physical location of options for the different boxes, and thus that a minimum additional license cost of US$500 per month is factored into the total cost of the path through the alternative z/LINUX middleware option 204a relative to the cost of path through the current x/WINDOWS 204c option.

Figure 6:
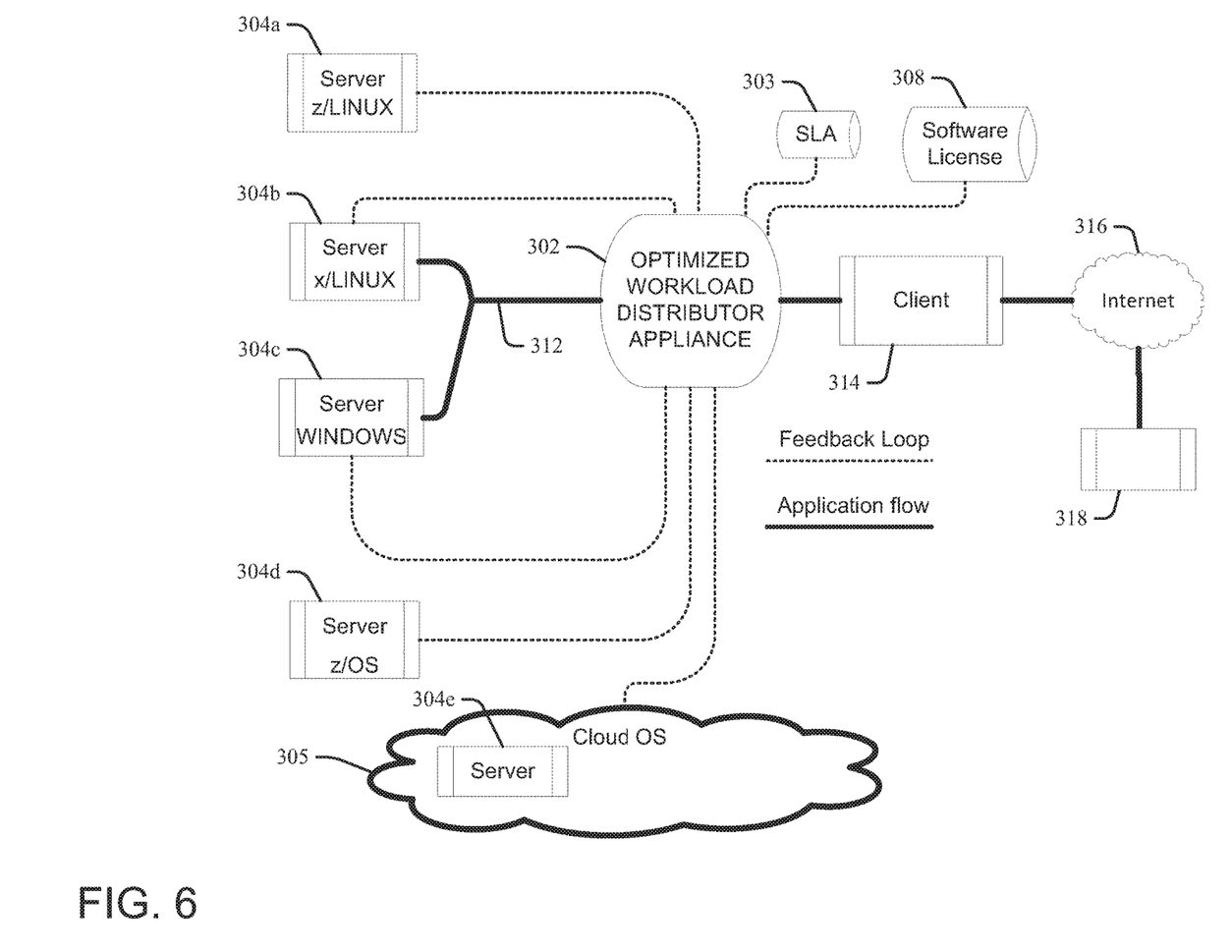
FIG. 6 is a graphic illustration of an alternative embodiment of the present invention for a two-tier computer system.

FIG. 6 is a graphic illustration of an alternative embodiment of the present invention for a two-tier architecture wherein the processing pathway options are server options. An alternative Optimized Distributor Workload Appliance ("optimizer") 302 according to the present invention is in a feedback circuit communication (denoted by the dotted-line connections in FIG. 6) with and thereby takes in response time feeds from each of available and selectable server options operating systems that include a Z/LINUX server 304a, an x/LINUX server 304b, a WINDOWS server 304c, a Z/OS server 304d and cloud-based server 304e that has a cloud-based operating system. Client transactions 314 are driven in response to smartphone or other programmable device 318 inputs received from the internet 316 or other network communication option. The client 314 loading is static while processing loads distributed to the server options 304a, 304b, 304c, 304d and 304e are varied by optimizer 302 in a fashion similar or analogous to the processes and examples described above with respect to the three-tier system of FIG. 5, thus according to determined differences in their hardware performance costs, needs and attributes, SLA costs and software licensing costs, as a function of data from the SLA database 303 data and the software license database 308.

Thus, aspects of the present invention provide linear optimization models that determine optimal weighting of the response time versus the software costs through a feedback loop. The aspects determine and describe various ways the cost of delivery can be derived and the benefits of one type of delivery over another versus the cost of each delivery, which may vary based on many factors, including time of day, MSUs, license limits, user-defined capacity, rolling four-hour averages, and Z/OS applications for non-specialty engine work vs. midrange/mobile workload pricing.

Optimization appliances 202 and 302 according to the present invention may bias toward loading selected middleware or server options to near peak capacity in response to determining that license costs do not accrue from associated increases in CPU time expenditures. This lowers total path costs as compared to prior art approaches that would otherwise migrate loads to alternative options to stay below peak loading, wherein the migration results in incurring additional license purchase costs. For example, when a license for an additional core or integrated facility for Power Integrated Facility for LINUX (Power IFL) is paid, the price of an individual transaction gets cheaper with increases in loading in the core or IFL. Aspects may run a CPU at a 100% busy level, above allowable tolerances in prior art management, in response to determining or predicting that a risk of an SLA penalty is high unless this configuration is adopted, calculating which options to use to either incur an affordable SLA penalty (relative to high licensing or performance costs), or to avoid the SLA penalty.

Prior art methods do not teach moving workloads for cost optimization in response to the inputs and determination specifically defined and described herein. Prior art teachings as to optimizing workload across operating systems generally do not take into account mainframe specialty engines and software costs as inputs to drive decisions, but instead focus upon only response time objectives. Aspects of the present invention provide advantages in the cost efficient management and operation of mainframes resources, by enabling greater flexibility for workloads running across multiple operating systems and enabling customers to automatically and autonomously select between cost-optimization options that may be deployed across midrange and mainframe environments without incurring SLA penalties.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
obtaining a response time feed value in milliseconds for a first middleware operating system executing on a first server of a plurality of servers to execute a first read-only query operation of an input structured query language (SQL) query task, wherein the input SQL query task comprises a plurality of read-only query operations for execution against a database memory device, wherein the plurality of servers each comprise different instances of one or more computer operating systems;
in response to determining that the response time feed value obtained for the first middleware operating system executing on the first server exceeds a time limit, identifying each of a plurality of alternative middleware operating systems that are different from the first middleware operating system and executing on the plurality of servers and that are available for executing a database operation transaction;
determining respective cost penalty amounts for executions of the input SQL query task plurality of read-only query operations by the first and each of the alternative middleware operating systems exceeding the time limit;
estimating respective response times for executing the input SQL query task plurality of read-only query operations via each of the alternative middleware operating systems based on historic response time feed values in milliseconds of each of the plurality of servers to execute read-only query operation database transactions via executing the alternative middleware operating systems;
determining respective computer processing hardware costs for executing the input SQL query task plurality of read-only query operations via each of the first middleware operating system and the alternative middleware operating systems, wherein the hardware costs comprise costs selected from a group consisting of: hardware equipment acquisition costs, hardware equipment power costs, hardware equipment maintenance costs, software costs and differential labor costs;
determining respective licensing costs for migrating execution of the plurality of read-only query operations of the input SQL query task to each of the alternative middleware operating systems from the first middleware operating system, wherein the licensing costs are selected from a group consisting of: site license costs, host license costs, instance license costs, and migration costs; and
migrating execution of a second read-only query operation of the plurality of read-only query operations that is subsequent to the first read-only query operation to a one of the alternative middleware operating systems that has a lowest total combined cost of respective ones of the licensing costs, the computer processing hardware costs and the cost penalty amounts.

2. The method of claim 1, further comprising:
integrating computer-readable program code into a computer system comprising a processor, a computer readable memory in circuit communication with the processor, and a computer-readable storage medium in circuit communication with the processor; and
the processor executing the computer-readable program code stored on the computer-readable storage medium via the computer readable memory and thereby performing the obtaining the response time feed value in milliseconds, the identifying each of the plurality of alternative middleware operating systems, the determining the respective cost penalty amounts, the estimating the respective response times, the determining the respective computer processing hardware costs, the determining the respective licensing costs, and the migrating the execution of the second read-only query operation.

3. The method of claim 2, wherein the integrating the computer-readable program code comprises providing the computer-readable program code as a service in a cloud environment.

4. The method of claim 1, wherein the time limit is a response time percentile index value; and the method further comprising:
determining a value of at least one of the cost penalty amounts in response to determining that a percentage of transaction response times for executing the input SQL query task plurality of read-only query operations exceeds the response time percentile index value during an execution time period.

5. The method of claim 1, wherein the first and the alternative middleware operating systems are selected from the group consisting of: LINUX, TIVOLI, WEBSHERE, WINDOWS and Cloud OS middleware operating systems.

6. The method of claim 1, further comprising:
determining availability of mainframe specialty engines on mainframe equipment associated with executing each of the alternative middleware operating systems on the plurality of servers; and
estimating the respective response times for executing the input SQL query task plurality of read-only query operations via each of the first middleware operating system and the alternative middleware operating systems as functions of identifying ones of the mainframe specialty engines that are available for the respective first middleware operating system and the alternative middleware operating systems to execute the plurality of read-only query operations.

7. The method of claim 6 further comprising:
determining a first licensing cost for a first of the plurality of alternative middleware operating systems to have a value of zero in response to determining that a first middleware software license enables execution of an instance of the first alternative middleware operating system that is additional to an instance of the first middleware operating system currently executing on the first server; and
determining a second licensing cost for a second of the plurality of alternative middleware operating systems to have a non-zero value in response to determining that a different, second middleware software license limits a hardware location of a hosting of an instance of the second alternative middleware operating system to a same server as a server hosting the first middleware operating system instance, and in response to determining that locations of the first middleware operating system and the second alternative middleware operating system instances are on different respective servers.

8. The method of claim 7, further comprising:
determining the computer processing hardware cost for executing the input SQL query task plurality of read-only query operations on the first alternative middleware operating system in response to determining that a license restriction prevents execution of a database operation transaction on a specialty central processing unit executing the first alternative middleware operating system as a function of an application software type of the first alternative middleware operating system or a distributed platform origination location of the executing the database operation transaction relative to a server location of execution of the first alternative middleware operating system; and determining the computer processing hardware cost for executing the input SQL query determining the computer processing hardware cost for executing the input SQL query task plurality of read-only query operations on the second middleware operating system that is different from the computer processing hardware cost determined for the first alternative middleware operating system in response to determining that a license restriction term does not prevent execution of database operation transactions on a specialty central processing unit that is executing in association with the second middleware operating system.

9. The method of claim 7, further comprising:

determining the computer processing hardware cost for executing the input SQL query task plurality of read-only query operations on the first alternative middleware operating system as a function of a peak rolling 4 hour average software pricing value of the first alternative middleware operating system; and determining the computer processing hardware cost for executing the input SQL query determining the computer processing hardware cost for executing the input SQL query task plurality of read-only query operations on the second alternative middleware operating system that is different from the computer processing hardware cost determined for the first alternative middleware operating system as a function of determining a peak load usage pricing value of the second alternative middleware operating system.

10. The method of claim 7, further comprising:

determining that the cost penalty amount for the first alternative middleware operating system is a non-zero value in response to predicting that a response time value of the first alternative middleware operating system is less than a service level threshold value, and that it will exceed the service level threshold value as a function of a logical partition loading value of the first alternative middleware operating system.

11. A system, comprising:

a computer processor;

a computer readable memory in circuit communication with the computer processor; and a computer-readable storage medium in circuit communication with the computer processor;

obtains a response time feed value in milliseconds for a first middleware operating system executing on a first server of a plurality of servers to execute a first read-only query operation of an input structured query language (SQL) query task, wherein the input SQL query task comprises a plurality of read-only query operations for execution against a database memory device, wherein the plurality of servers each comprise different instances of one or more computer operating systems;

in response to determining that the response time feed value obtained for the first middleware operating system executing on the first server exceeds a time limit, identifies each of a plurality of alternative middleware operating systems that are different from the first middleware operating system and executing on the plurality of servers and that are available for executing a database operation transaction;

determines respective cost penalty amounts for executions of the input SQL query task plurality of read-only query operations by the first and each of the alternative middleware operating systems exceeding the time limit;

estimates respective response times for executing the input SQL query task plurality of read-only query operations via each of the alternative middleware operating systems based on historic response time feed values in milliseconds of each of the plurality of servers to execute read-only query operation database transactions via executing the alternative middleware operating systems;

determines respective computer processing hardware costs for executing the input SQL query task plurality of read-only query operations via each of the first middleware operating system and the alternative middleware operating systems, wherein the hardware costs comprise costs selected from a group consisting of: hardware equipment acquisition costs, hardware equipment power costs, hardware equipment maintenance costs, software costs and differential labor costs;

determines respective licensing costs for migrating execution of the plurality of read-only query operations of the input SQL query task to each of the alternative middleware operating systems from the first middleware operating system, wherein the licensing costs are selected from a group consisting of: site license costs, host license costs, instance license costs, and migration costs; and migrates execution of a second read-only query operation of the plurality of read-only query operations that is subsequent to the first read-only query operation to a one of the alternative middleware operating systems that has a lowest total combined cost of respective ones of the licensing costs, the computer processing hardware costs and the cost penalty amounts.

12. The system of claim 11, wherein the first and the alternative middleware operating systems are selected from the group consisting of: LINUX, TIVOLI, WEBSHERE, WINDOWS and Cloud OS middleware operating systems.

13. The system of claim 11, wherein the processor executes the program instructions stored on the computer-readable storage medium via the computer readable memory and thereby:

determines availability of mainframe specialty engines on mainframe equipment associated with executing each of the alternative middleware operating systems on the plurality of servers; and estimates the respective response times for executing the input SQL query task plurality of read-only query operations via each of the first middleware operating system and the alternative middleware operating systems as functions of identifying ones of the mainframe specialty engines that are determined to be available for the respective first middleware operating system and the alternative middleware operating systems to execute the plurality of read-only query operations.

14. The system of claim 13, wherein the processor executes the program instructions stored on the computer-readable storage medium via the computer readable memory and thereby:

determines a first licensing cost for a first of the plurality of alternative middleware operating systems to have a value of zero in response to determining that a first middleware software license enables execution of an instance of the first alternative middleware operating system that is additional to an instance of the first middleware operating system executing on the first server; and determines a second licensing cost for a second of the plurality of alternative middleware operating systems to have a non-zero value in response to determining that a different, second middleware software license limits a hardware location of a hosting of an instance of the second alternative middleware operating system to a same server as a server hosting the first middleware operating system instance, and in response to determining that locations of the first middleware operating system instance and the second alternative middleware operating system instance are on different respective computer system servers.

15. The system of claim 14, wherein the processor executes the program instructions stored on the computer-readable storage medium via the computer readable memory and thereby:

determines the computer processing hardware cost for executing the plurality of read-only query operations on the first alternative middleware operating system in response to determining that a license restriction prevents execution of a database operation transaction on a specialty central processing unit executing the first alternative middleware operating system as a function of an application software type of the first alternative middleware operating system or a distributed platform origination location of executing the database operation transaction relative to a server location of the first alternative middleware operating system; and determines the computer processing hardware cost for executing the input SQL query task plurality of read-only query operations on the second alternative middleware operating system that is different from the computer processing hardware cost determined for the first alternative middleware operating system in response to determining that a license restriction term does not prevent execution of database operation transactions on a specialty central processing unit that is executing in association with the second alternative middleware operating system.

16. A computer program product, comprising:

a computer readable storage medium having computer readable program code embodied therewith, the computer readable program code comprising instructions for execution by a processor that cause the processor to:

obtain a response time feed value in milliseconds for a first middleware operating system executing on a first server of a plurality of servers to execute a first read-only query operation of an input structured query language (SQL) query task, wherein the input SQL query task comprises a plurality of read-only query operations for execution against a database memory device, wherein the plurality of servers each comprise different instances of one or more computer operating systems;

in response to determining that the response time feed value obtained for the first middleware operating system executing on the first server exceeds a time limit, identify each of a plurality of alternative middleware operating systems that are different from the first middleware operating system and executing on the plurality of servers and that are available for executing a database operation transaction;

determine respective cost penalty amounts for executions of the input SQL query task plurality of read-only query operations by the first and each of the alternative middleware operating systems exceeding the time limit;

estimate respective response times for executing the input SQL query task plurality of read-only query operations via each of the alternative middleware operating systems based on historic response time feed values in milliseconds of each of the plurality of servers to execute read-only query operation database transactions via executing the alternative middleware operating systems;

determine respective computer processing hardware costs for executing the input SQL query task plurality of read-only query operations via each of the first middleware operating system and the alternative middleware operating systems, wherein the hardware costs comprise costs selected from a group consisting of: hardware equipment acquisition costs, hardware equipment power costs, hardware equipment maintenance costs, software costs and differential labor costs;

determine respective licensing costs for migrating execution of the plurality of read-only query operations of the input SQL query task to each of the alternative middleware operating systems from the first middleware operating system, wherein the licensing costs are selected from a group consisting of: site license costs, host license costs, instance license costs, and migration costs; and migrate execution of a second read-only query operation of the plurality of read-only query operations that is subsequent to the first read-only query operation to a one of the alternative middleware operating systems that has a lowest total combined cost of respective ones of the licensing costs, the computer processing hardware costs and the cost penalty amounts.

17. The computer program product of claim 16, wherein the first and the alternative middleware operating systems are selected from the group consisting of: LINUX, TIVOLI, WEBSHERE, WINDOWS and Cloud OS middleware operating systems.

18. The computer program product of claim 16, wherein the computer readable program code instructions cause the processor to:

determine availability of mainframe specialty engines on mainframe equipment associated with executing each of the alternative middleware operating systems on the plurality of servers; and estimate the respective response times for executing the input SQL query task plurality of read-only query operations via each of the first middleware operating system and the alternative middleware operating systems as functions of identifying ones of the mainframe specialty engines that are determined to be available for the respective first middleware operating system and the alternative middleware operating systems to execute the plurality of read-only query operations.

19. The computer program product of claim 18, wherein the computer readable program code instructions cause the processor to:

determine a first licensing cost for a first of the plurality of alternative middleware operating systems to have a value of zero as in response to determining that a first middleware software license enables execution of an instance of the first alternative middleware operating system that is additional to an instance of the first middleware operating system executing on the first server; and determine a second licensing cost for a second of the plurality of alternative middleware operating systems to have a non-zero value in response to determining that a different, second middleware software license limits a hardware location of a hosting of an instance of the second alternative middleware operating system to a same server as a server hosting the first middleware operating system instance, and in response to determining that locations of the first middleware operating system and the second alternative middleware operating system instances are on different respective servers.

* * * * *